US012731444B2

(12) United States Patent
Honya et al.

(10) Patent No.: US 12,731,444 B2
(45) Date of Patent: Sep. 8, 2026

(54) ELECTRONIC CONTROL DEVICE, STORAGE MEDIUM STORING MANAGEMENT PROGRAM, MANAGEMENT METHOD, AND SERVICE PROVISION SYSTEM

(71) Applicant: DENSO CORPORATION, Kariya-city (JP)

(72) Inventors: Hideyuki Honya, Kariya-city (JP); Hideyuki Yamaguchi, Kariya-city (JP)

(73) Assignee: DENSO CORPORATION, Kariya-city (JP)

( * ) Notice: Subject to any disclaimer, the term of this patent is extended or adjusted under 35 U.S.C. 154(b) by 27 days.

(21) Appl. No.: 19/039,239

(22) Filed: Jan. 28, 2025

(65) Prior Publication Data

US 2025/0174054 A1 May 29, 2025

Related U.S. Application Data

(63) Continuation of application No. PCT/JP2023/027798, filed on Jul. 28, 2023.

(30) Foreign Application Priority Data

Aug. 3, 2022 (JP) ................................ 2022-123986

(51) Int. Cl.
*G07C 5/00* (2006.01)
*G06F 11/34* (2006.01)

(52) U.S. Cl.
CPC .......... *G07C 5/008* (2013.01); *G06F 11/3452* (2013.01); *G06F 11/3476* (2013.01)

(58) Field of Classification Search
CPC . G07C 5/008; G06F 11/3452; G06F 11/3476; G06F 9/54; G06F 11/30; G06F 11/34; G06Q 50/10
See application file for complete search history.

(56) References Cited

U.S. PATENT DOCUMENTS

2015/0100686 A1* 4/2015 Sakurai ............... H04L 43/0817 709/224
2019/0121661 A1* 4/2019 Kanada .................. H02J 7/143
(Continued)

FOREIGN PATENT DOCUMENTS

DE 112024001868 T5 * 3/2026 ............ G06Q 50/40
JP 2005044058 A * 2/2005
(Continued)

OTHER PUBLICATIONS

JP-2005044058-A translation (Year: 2005).*
(Continued)

*Primary Examiner* — Kyle T Johnson
(74) *Attorney, Agent, or Firm* — Harness, Dickey & Pierce, P.L.C.

(57) ABSTRACT

An electronic control device includes a coordination control section configured to implement coordination between a service-system functional block and a control-system functional block. The coordination control section includes a request transfer section transferring the access request transmitted from the service-system functional block to the control-system functional block, a log creation section creating an access log and storing the created access log in a preset first storage section, a statistical log creation section executing a statistical process on execution statuses of a plurality of the access requests, creating a statistical access log, and storing the created statistical access log in a preset second storage section, a statistical transmission section transmitting the statistical access log to a server, a log transmission section transmitting the access log to the server, and a log deletion section configured to delete the access log from the first storage section.

13 Claims, 10 Drawing Sheets

(56) References Cited

U.S. PATENT DOCUMENTS

| | | | | |
|---|---|---|---|---|
| 2019/0213068 | A1* | 7/2019 | Upadhyay | G06F 11/302 |
| 2021/0320937 | A1* | 10/2021 | Aso | G06F 11/3006 |
| 2023/0156027 | A1* | 5/2023 | Sugashima | H04W 12/122 726/22 |
| 2025/0174054 | A1* | 5/2025 | Honya | G06F 11/3452 |
| 2025/0191038 | A1* | 6/2025 | Yamaguchi | G06Q 20/08 |

FOREIGN PATENT DOCUMENTS

| | | | | |
|---|---|---|---|---|
| JP | 2020038439 | A | 3/2020 | |
| JP | 2022017889 | A | 1/2022 | |
| WO | WO-2011065739 | A2 * | 6/2011 | G06F 11/3476 |

OTHER PUBLICATIONS

WO-2011065739-A2 translation (Year: 2011).*
DE-112024001868-T5 translation (Year: 2026).*
Data_transmission_options_for_VMT_data_and_Fee_collection_centers_2002 (Year: 2002).*
Mobile_Edge_Intelligence_and_Computing_for_the_Internet_of_Vehicles2020 (Year: 2020).*

* cited by examiner

SERVER
3
CONTROL
CPU
11a
11
ROM
11b
RAM
11c
COMMUNICATION
12
STORAGE
13
NW
1
VEHICLE CONTROL SYSTEM
2
ECU
4a
CPU
4b
ROM
4c
RAM
4d
FLASH ROM
4
EXTRA-VEHICLE COMMUNICATION
7
INTRA-VEHICLE COMMUNICATION NETWORK
8
ECU
5
ECU
6

FIG. 3

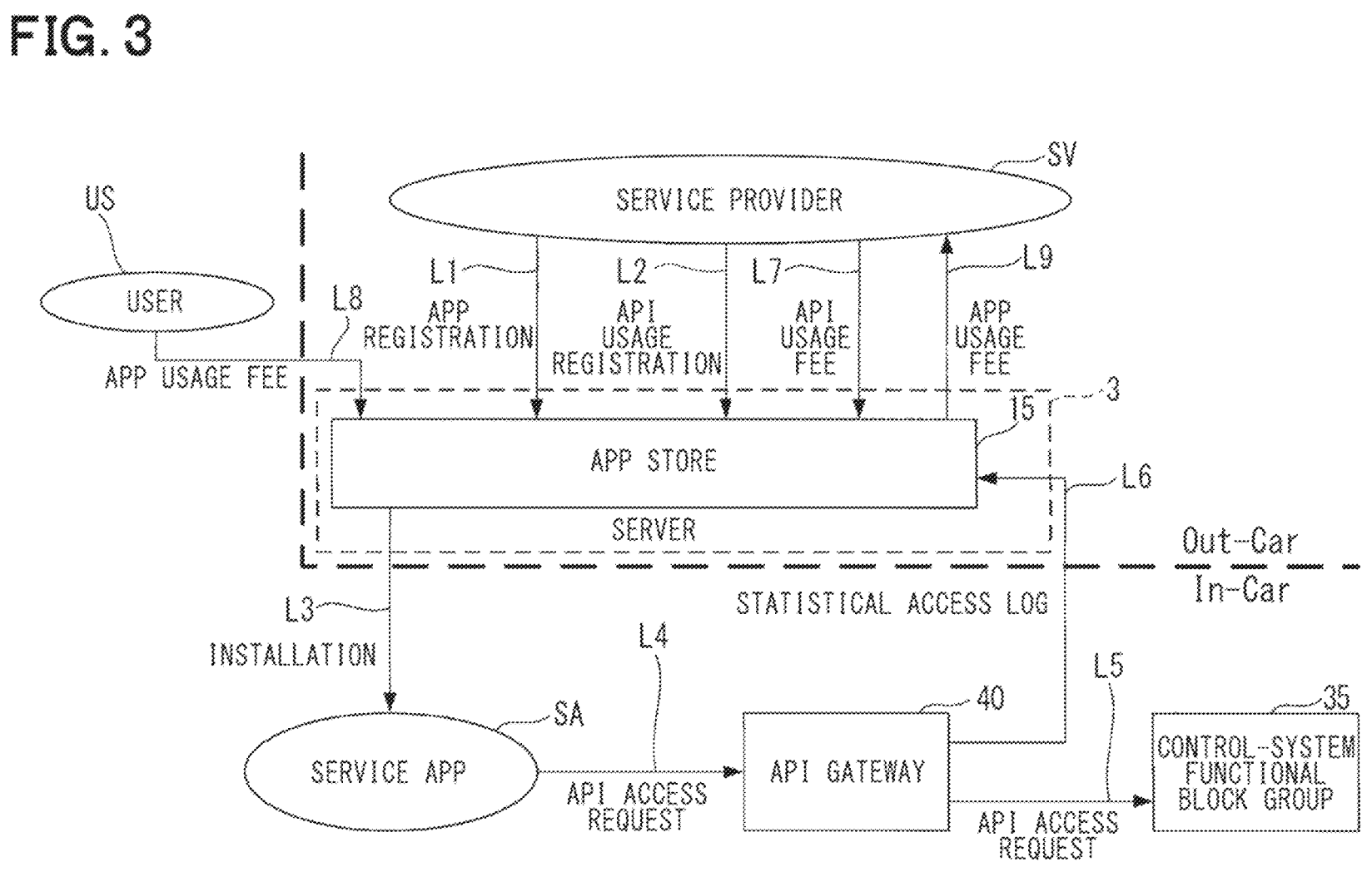

US
USER
APP USAGE FEE
L8
SV
SERVICE PROVIDER
L1
APP REGISTRATION
L2
API USAGE REGISTRATION
L7
API USAGE FEE
L9
APP USAGE FEE
3
15
APP STORE
SERVER
L6
STATISTICAL ACCESS LOG
Out-Car
In-Car
L3
INSTALLATION
SA
SERVICE APP
L4
API ACCESS REQUEST
40
API GATEWAY
L5
API ACCESS REQUEST
35
CONTROL-SYSTEM FUNCTIONAL BLOCK GROUP

FIG. 6

| NO. | ITEM NAME |
|---|---|
| 1 | API-PROVIDING APP ID |
| 2 | API-ID |
| 3 | CALLER APP ID |
| 4 | API CALL COUNT |
| 5 | API EXECUTION COMPLETION COUNT |
| 6 | API EXECUTION UNNECESSARY OCCURRENCE COUNT |
| 7 | API EXECUTION ANOMALY COUNT |
| 8 | API COMMUNICATION DATA AMOUNT |
| 9 | EXECUTION COMPLETION COUNT DURING NON-POWERED PARKING |
| 10 | EXECUTION COMPLETION COUNT DURING POWERED PARKING |
| 11 | EXECUTION COMPLETION COUNT DURING STOP |
| 12 | EXECUTION COMPLETION COUNT DURING TRAVEL |

FIG. 9

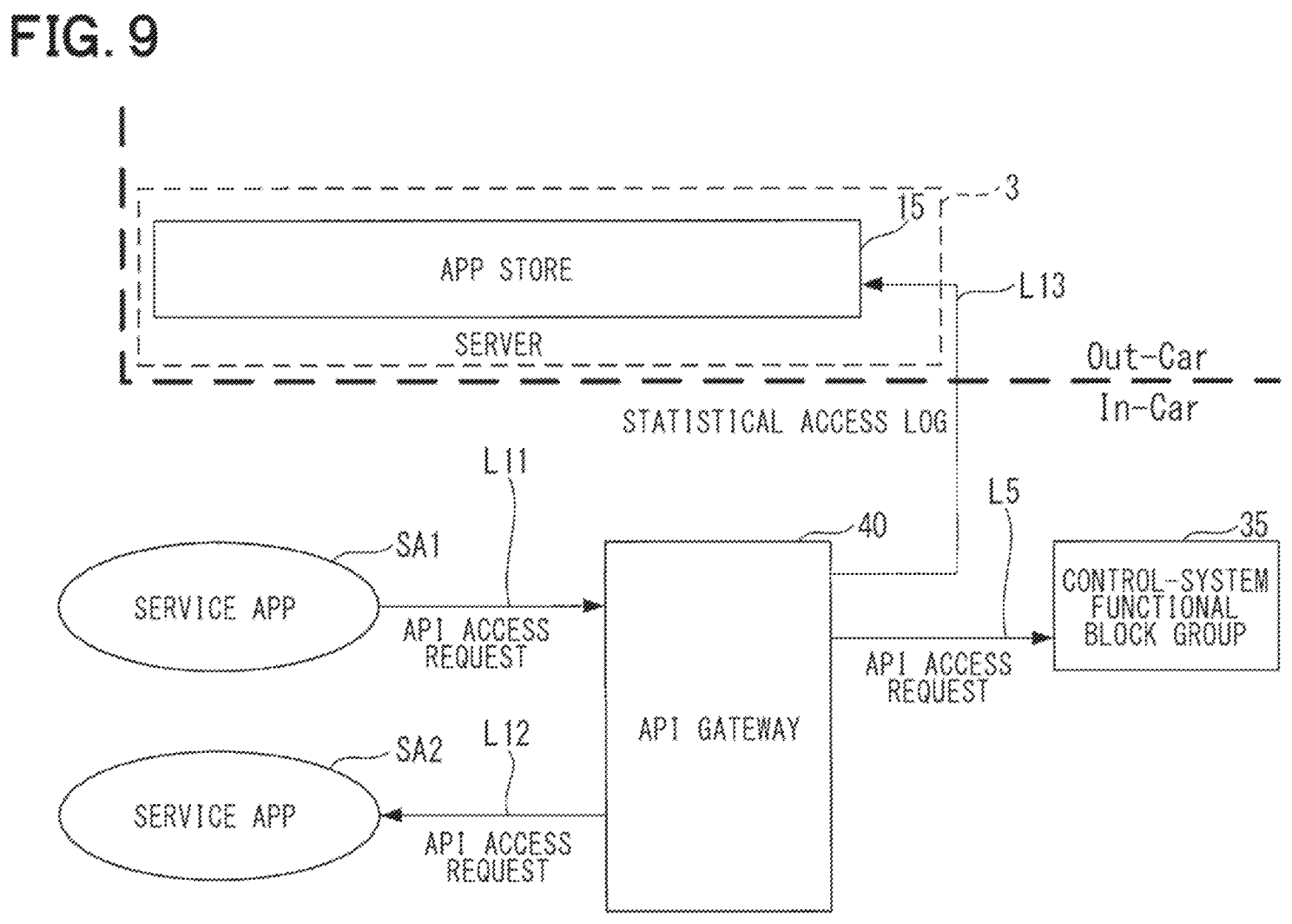

Out-Car
In-Car
35
CONTROL-SYSTEM FUNCTIONAL BLOCK GROUP
3
L13
15
APP STORE
SERVER
STATISTICAL ACCESS LOG
L5
API ACCESS REQUEST
40
API GATEWAY
L11
API ACCESS REQUEST
SA1
SERVICE APP
L12
API ACCESS REQUEST
SA2
SERVICE APP

ELECTRONIC CONTROL DEVICE, STORAGE MEDIUM STORING MANAGEMENT PROGRAM, MANAGEMENT METHOD, AND SERVICE PROVISION SYSTEM

CROSS REFERENCE TO RELATED APPLICATION

The present application is a continuation application of International Patent Application No. PCT/JP2023/027798 filed on Jul. 28, 2023 which designated the U.S. and claims the benefit of priority from Japanese Patent Application No. 2022-123986 filed on Aug. 3, 2022. The entire disclosures of all of the above applications are incorporated herein by reference.

TECHNICAL FIELD

The present disclosure relates to an electronic control device, a management program, a management method, and a service provision system that perform management for providing a service to a vehicle.

BACKGROUND

A related art describes that a log management device mounted in a vehicle transmits, according to a predetermined condition, a log generated by a security sensor or a statistical process result, generated by performing a statistical process on a plurality of logs, to a center device installed outside the vehicle.

SUMMARY

An electronic control device includes a coordination control section configured to implement coordination between a service-system functional block and a control-system functional block. The coordination control section includes a request transfer section transferring the access request transmitted from the service-system functional block to the control-system functional block, a log creation section creating an access log and storing the created access log in a preset first storage section, a statistical log creation section executing a statistical process on execution statuses of a plurality of the access requests, creating a statistical access log, and storing the created statistical access log in a preset second storage section, a statistical transmission section transmitting the statistical access log to a server, a log transmission section transmitting the access log to the server, and a log deletion section configured to delete the access log from the first storage section.

BRIEF DESCRIPTION OF DRAWINGS

Objects, features and advantages of the present disclosure will become more apparent from the following detailed description made with reference to the accompanying drawings. In the drawings:

FIG. 3 is a block diagram illustrating a charging procedure;

FIG. 6 is a diagram illustrating a configuration of a statistical access log;

FIG. 9 is a block diagram illustrating the transmission and reception of an API access request between service applications.

DETAILED DESCRIPTION

Figure 1:
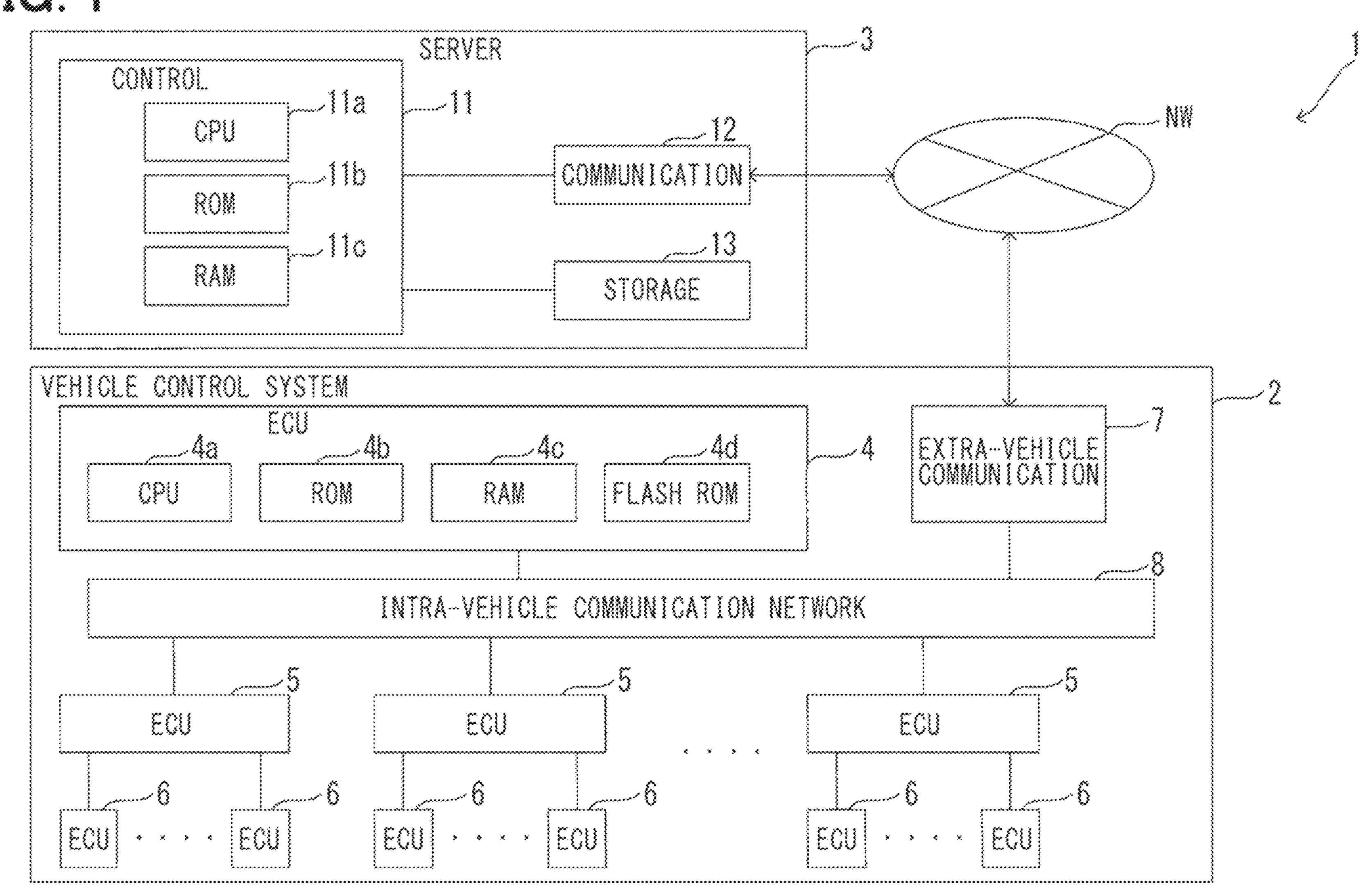
FIG. 1 is a block diagram illustrating a configuration of a service provision system.

When a service provider provides a service to a vehicle, it may be necessary to acquire, from a target vehicle to be provided with the service, vehicle information on the vehicle or to cause the target vehicle to perform a predetermined operation or process.

As a result of the detailed study of the inventor, it has been found desirable that the service provider is charged appropriately according to the use of the vehicle when the service provider uses the vehicle by acquiring vehicle information from the vehicle or causing the vehicle to perform a predetermined operation or process.

The present disclosure appropriately transmits a log from a vehicle in order to appropriately charge a service provider who provides a service to the vehicle.

One aspect of the present disclosure is an electronic control device mounted in a vehicle and including a coordination control section. The coordination control section is configured to implement coordination between a service-system functional block, configured to provide a service to an equipped vehicle that is the vehicle equipped with the electronic control device, and a control-system functional block, configured to control the equipped vehicle.

The control-system functional block includes a functional interface. The functional interface is configured to convert an access request, expressed in a vehicle-independent format and transmitted from the service-system functional block, into a vehicle-dependent format.

The coordination control section includes a request transfer section, a log creation section, a statistical log creation section, a statistical transmission section, a log transmission section, and a log deletion section.

The request transfer section is configured to transfer the access request transmitted from the service-system functional block to the control-system functional block.

The log creation section is configured to create an access log indicating an execution status of the access request for each of access requests, that is the access request, transmitted from the service-system functional block, and store the created access log in a preset first storage section.

The statistical log creation section is configured to execute a statistical process on execution statuses of a plurality of the access requests, create a statistical access log indicating a result of the statistical process, and store the created statistical access log in a preset second storage section.

The statistical transmission section is configured to transmit the statistical access log to a server when a preset statistical transmission condition is satisfied. The server is installed outside the vehicle and performs a charging process based on the statistical access log.

The log transmission section is configured to transmit the access log stored in the first storage section to the server when data communication with the server is possible.

The log deletion section is configured to delete the access log from the first storage section when a preset log deletion condition is satisfied.

The electronic control device of the present disclosure configured as described above can transmit the statistical access log and the access log to the server that performs the charging process.

Moreover, the electronic control device of the present disclosure transmits the access log stored in the first storage section to the server when data communication with the server is possible, and deletes the access log from the first storage section when the log deletion condition is satisfied. Therefore, the electronic control device of the present disclosure can suppress the occurrence of a situation where a new access log cannot be transmitted to the server due to the fact that a new access log cannot be stored because the access log is stored up to the upper limit of the storage capacity of the first storage section. This enables the electronic control device of the present disclosure to suppress the occurrence of a situation where a service provider who provides a service to the vehicle cannot be charged appropriately.

Another aspect of the present disclosure is a management program for causing a computer of an electronic control device including a coordination control section to function as a request transfer section, a log creation section, a statistical log creation section, a statistical transmission section, a log transmission section, and a log deletion section.

The computer controlled by the management program of the present disclosure can constitute a part of the electronic control device of the present disclosure, and can obtain effects similar to those of the electronic control device of the present disclosure.

Another aspect of the present disclosure is a management method executed by an electronic control device including a coordination control section configured to implement coordination between a service-system functional block and a control-system functional block configured to control an equipped vehicle with a functional interface.

The management method of the present disclosure transfers an access request transmitted from the service-system functional block to the control-system functional block.

The management method of the present disclosure further creates an access log indicating an execution status of the access request for each of access requests transmitted from the service-system functional block, and stores the created access log in a preset first storage section.

The management method of the present disclosure further executes a statistical process on execution statuses of a plurality of the access requests, creates a statistical access log indicating a result of the statistical process, and stores the created statistical access log in a preset second storage section.

The management method of the present disclosure further transmits the statistical access log to a server when a preset statistical transmission condition is satisfied.

The management method of the present disclosure further transmits the access log stored in the first storage section to the server when data communication with the server is possible.

The management method of the present disclosure further deletes the access log from the first storage section when a preset log deletion condition is satisfied.

The management method of the present disclosure is a method executed by the electronic control device of the present disclosure, and by executing the method, effects similar to those of the electronic control device of the present disclosure can be obtained.

Another aspect of the present disclosure is an electronic control device mounted in a vehicle and including a coordination control section. The coordination control section is configured to implement coordination between a service-system functional block and a control-system functional block configured to control the equipped vehicle with a functional interface.

The coordination control section includes a request transfer section, a log creation section, a statistical log creation section, a statistical transmission section, a log transmission section, and a log deletion section.

The electronic control device of the present disclosure configured as described above can suppress the occurrence of a situation where a service provider who provides a service to the vehicle cannot be charged appropriately.

Another aspect of the present disclosure is a service provision system including an electronic control device mounted in a vehicle and a server configured to be capable of data communication with the electronic control device.

The electronic control device includes a coordination control section. The control-system functional block includes a functional interface.

The coordination control section includes a request transfer section, a log creation section, a statistical log creation section, a statistical transmission section, a log transmission section, and a log deletion section.

The server is configured to calculate an interface usage fee generated by the service-system functional block using the functional interface, based on the access log and the statistical access log created by the coordination control section.

The service provision system of the present disclosure configured as described above is a system including the electronic control device of the present disclosure, and can obtain effects similar to those of the electronic control device of the present disclosure.

First Embodiment

Hereinafter, a first embodiment of the present disclosure will be described with reference to the drawings.

As illustrated in FIG. 1, a service provision system 1 of the present embodiment includes a vehicle control system 2 and a server 3.

The vehicle control system 2 is mounted in a vehicle and has a function of performing data communication with the server 3 via a wide-area wireless communication network NW.

The server 3 has a function of performing data communication with the vehicle control system 2 via the wide-area wireless communication network NW. In the server 3, an application store accessible via the wide-area wireless communication network NW or the Internet is installed.

The vehicle in which the vehicle control system 2 is mounted may have an automated driving function in addition to a manual driving function. The vehicle may be a hybrid vehicle with an engine and an electric motor as the drive source for travel. The vehicle is not limited to a vehicle with an automated driving function and a hybrid vehicle, and may be a vehicle with only a manual driving function, or may be a vehicle with only an engine or only an electric motor as the drive source for travel. Hereinafter, the vehicle in which the vehicle control system 2 is mounted is simply referred to as the vehicle.

The vehicle control system 2 includes one ECU 4, a plurality of ECUs 5, a plurality of ECUs 6, an extra-vehicle communication device 7, and an intra-vehicle communication network 8. ECU stands for an electronic control unit.

The ECU 4 unifies the plurality of ECUs 5 to implement coordinated control of the entire vehicle.

The ECU 5 is provided for each domain divided according to functions in the vehicle and mainly executes control of a plurality of ECUs 6 existing in the domain. Each ECU 5 is connected to its subordinate ECU 6 via a lower-level network (e.g., CAN) provided individually. CAN stands for Controller Area Network. CAN is a registered trademark. The domain is, for example, a powertrain, a body, a chassis, a cockpit, or the like.

The ECUs 6 connected to the ECU 5 belonging to the powertrain domain include, for example, an ECU 6 that controls the engine, an ECU 6 that controls the motor, an ECU 6 that controls the battery, and the like.

The ECU 6 connected to the ECU 5 belonging to the body domain includes, for example, an ECU 6 that controls the air conditioner, an ECU 6 that controls the doors, and the like.

The ECU 6 connected to the ECU 5 belonging to the chassis domain includes, for example, the ECU 6 that controls the brake, the ECU 6 that controls the steering, and the like.

The ECU 6 connected to the ECU 5 belonging to the cockpit domain includes, for example, an ECU 6 that controls the meter and navigation display, an ECU 6 that controls the input device operated by a vehicle occupant, and the like.

The extra-vehicle communication device 7 performs data communication with the server 3 via the wide-area wireless communication network NW.

The intra-vehicle communication network 8 includes a CAN FD and Ethernet. Ethernet is a registered trademark. CAN FD stands for an abbreviation of CAN with Flexible Data Rate. The CAN FD connects the ECU 4, each ECU 5, and the extra-vehicle communication device 7 via a bus. The Ethernet individually connects the ECU 4, each ECU 5, and the extra-vehicle communication device 7.

The ECU 4 is an electronic control device mainly including a microcomputer provided with a central processing unit (CPU) 4*a*, a read-only memory (ROM) 4*b*, and random-access memory (RAM) 4*c*. Various functions of the microcomputer are each implemented by the CPU 4*a* executing a program stored in a non-transitory tangible recording medium. In this example, the ROM 4*b* corresponds to the non-transitory tangible recording medium storing a program. By executing the program, a method corresponding to the program is executed. Some or all of the functions executed by the CPU 4*a* may be configured as hardware by one or more integrated circuits (ICs) or the like. The number of microcomputers constituting the ECU 4 may be one or more.

The ECU 4 further includes a flash ROM 4*d*. The flash ROM 4*d* is a nonvolatile memory in which the storage content can be rewritten.

Similarly to the ECU 4, each of the ECUs 5, the ECUs 6, and the extra-vehicle communication device 7 is an electronic control device mainly including a microcomputer provided with a CPU, a ROM, a RAM, and the like. In addition, the number of microcomputers constituting each of the ECUs 5, the ECUs 6, and the extra-vehicle communication device 7 may be one or more. The ECU 5 unifies one or more ECUs 6. The ECU 4 unifies one or more ECUs 5, or unifies the ECUs 5, 6 and the extra-vehicle communication device 7 of the entire vehicle.

Hereinafter, the ECUs 4, 5, 6 and the extra-vehicle communication device 7 will be referred to as in-vehicle devices 4 to 7 unless otherwise distinguished.

The server 3 includes a control section 11, a communication section 12, and a storage section 13.

The control section 11 is an electronic control device mainly including a microcomputer provided with a CPU 11*a*, a ROM 11*b*, a RAM 11*c*, and the like. Various functions of the microcomputer are implemented by the CPU 11*a* executing a program stored in a non-transitory tangible recording medium. In this example, the ROM 11*b* corresponds to the non-transitory tangible recording medium storing a program. By executing the program, a method corresponding to the program is executed. Some or all of the functions executed by the CPU 11*a* may be configured as hardware by one or a plurality of ICs or the like. The number of microcomputers constituting the control section 11 may be one or more.

The communication section 12 performs data communication with the vehicle control system 2 via the wide-area wireless communication network NW. The storage section 13 is a storage device for storing various data.

Figure 2:
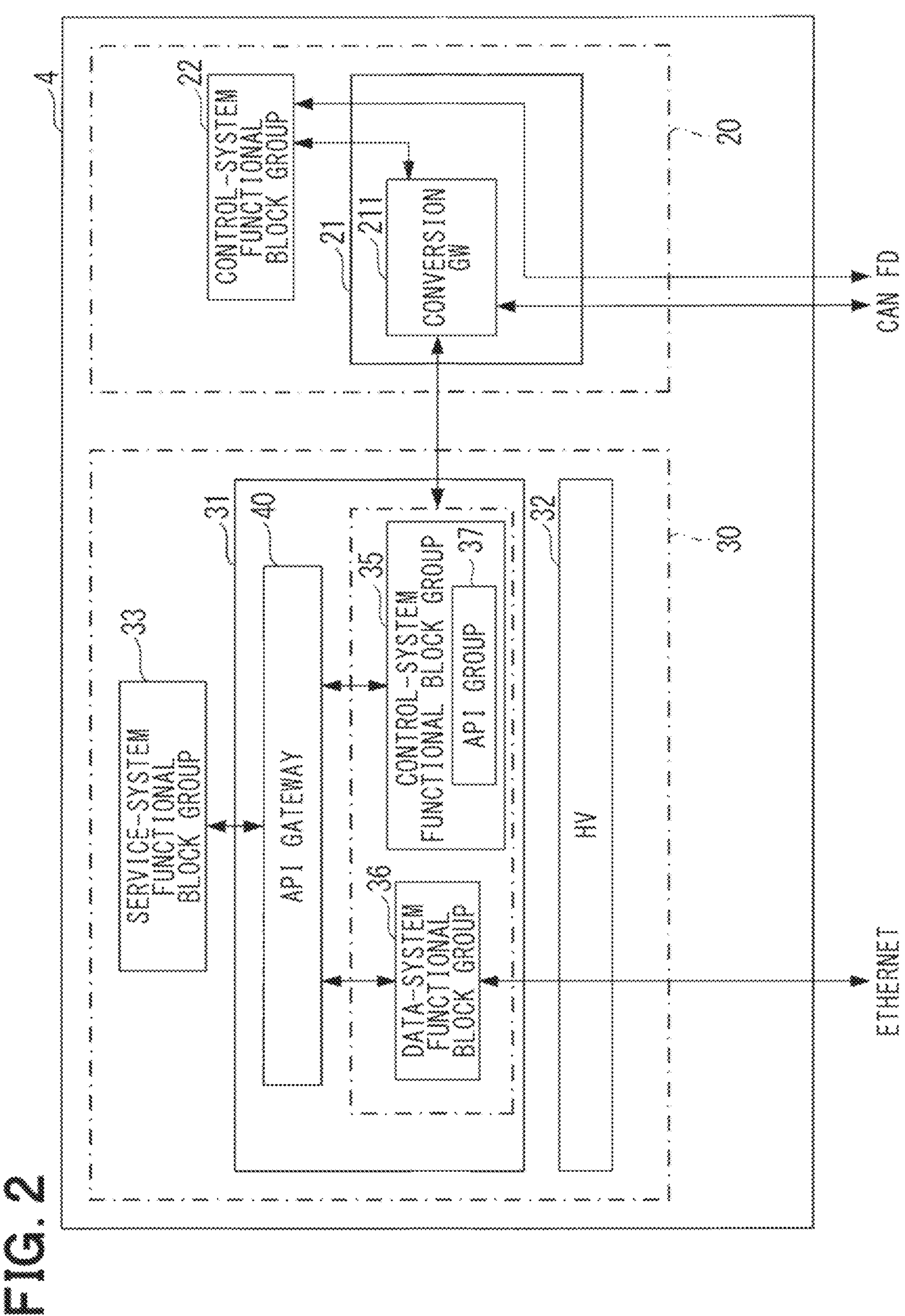
FIG. 2 is a block diagram illustrating a configuration of an electronic control unit (ECU)

As illustrated in FIG. 2, the ECU 4 includes a real-time processing section 20 and an application processing section 30 (hereinafter, application processing section 30). When the ECU 4 includes a plurality of CPUs 4*a*, the real-time processing section 20 and the application processing section 30 may be implemented by processing executed by the same CPU, or may be implemented by processing executed by different CPUs, respectively.

The real-time processing section 20 coordinates with the in-vehicle devices 5 to 7 connected via the CAN FD to execute vehicle control and the like that require real-time performance. The application processing section 30 coordinates with the in-vehicle devices 5 to 7 connected via the Ethernet to execute various applications (e.g., an entertainment application, etc.) that require high processing capability.

The application processing section 30 has a function of transmitting instructions and the like based on processing of various applications to the real-time processing section 20. The real-time processing section 20 has a function of transmitting information or the like, collected from the ECU or the like via the CAN FD, to the application processing section 30. As a result, the real-time processing section 20 and the application processing section 30 coordinate with each other to implement various functions.

The software of the vehicle control system 2 is constructed according to AUTOSAR. AUTOSAR is an architecture for automated driving and stands for Automotive Open System Architecture. AUTOSAR is a registered trademark. AUTOSAR provides not only communication between software components (hereinafter, SW-Cs), mounted to implement various applications, but also functions related to connection to a cloud, security, and the like. The SW-C is componentized software for implementing a certain function. The application program includes one or more SW-Cs. The software of the vehicle control system 2 is not necessarily constructed according to AUTOSAR.

Each of the devices belonging to the vehicle control system 2, that is, each of the ECUs 4, 5, 6 and the extra-vehicle communication device 7, includes a platform. The platform provides an environment for executing an SW-C described in a hardware-independent format.

The platform includes a runtime environment (hereinafter, RTE) and base software (BSW). The RTE is an interface that connects between SW-Cs and between an SW-C and a BSW. The BSW is a hierarchy connecting the hardware and the SW-C, and includes an operating system (OS), a driver, middleware, and the like. The function of the BSW is divided into fine modules, and the function of each module is provided to the SW-C via an API. API stands for Application Programming Interface.

Hereinafter, platforms included in the real-time processing section 20 are referred to as a first platform 21 (hereinafter, first PF 21), and the platform included in the application processing section 30 is referred to as a second platform 31 (hereinafter, second PF 31).

The real-time processing section 20 includes a control-system functional block group 22 as a set of service applications (hereinafter, service application) operating on the first PF 21. The service application is an application that receives a request from a client, processes the request, and returns a result.

The control-system functional block group 22 includes an API for receiving a command related to the vehicle's motion, and is an application group for unifying the commands received by the API to implement well-coordinated vehicle control. The control-system functional block group 22 outputs various commands to the in-vehicle devices 5 to 7, in which entities that execute control based on the commands exist, via the intra-vehicle communication network 8.

The first PF 21 includes a conversion gateway 211. The conversion gateway 211 has a function of converting a communication frame, received by the real-time processing section 20 via the CAN FD, into an Ethernet format and providing the converted communication frame to the application processing section 30. In addition, the conversion gateway 211 has a function of converting the communication frame in the Ethernet format, provided from the application processing section 30, into a CAN FD format.

The application processing section 30 includes a hypervisor 32 and executes software on a plurality of virtual machines. The hypervisor 32 may be omitted.

The application processing section 30 includes a service-system functional block group 33 as a set of service applications that operate on the second PF 31.

The service-system functional block group 33 is a set of service applications. Each service application includes one or more SW-Cs. The service application is provided not only by the vehicle manufacturer that manufactured the vehicle but also by a third party. Examples of the third party that provides the service application include a data utilization company that provides a service by collecting data from a vehicle.

The second PF 31 includes a control-system functional block group 35, a data-system functional block group 36, and an API gateway 40.

The control-system functional block group 35 is a set of programs including an API for receiving a request related to vehicle control from the service-system functional block group 33. The control-system functional block group 35 includes an API group 37 formed of a plurality of APIs. The control-system functional block group 35 converts an API access request from the service-system functional block group 33, expressed in a vehicle-independent format, into an API access request expressed in a vehicle-dependent format, and provides the converted request to the real-time processing section 20. The "vehicle-independent format" is a format common to vehicles (i.e., a format that absorbs differences among vehicle types). The "vehicle-dependent format" is a format specific to a vehicle.

The APIs provided by the control-system functional block group 35 include a motion-system API that controls the vehicle's motion and other non-motion-system APIs. The API access request received by the motion-system API is transferred to the control-system functional block group 35, and transferred from the control-system functional block group 35 to the in-vehicle devices 5 to 7 that execute control based on the request via the intra-vehicle communication network 8. The API access request received by the non-motion-system API is transferred to the in-vehicle devices 5 to 7 that execute control based on the request via the intra-vehicle communication network 8.

The data-system functional block group 36 is a set of programs including an API for handling vehicle data acquired and accumulated via the real-time processing section 20. The data-system functional block group 36 has a function of abstracting and accumulating vehicle data, expressed in a vehicle-dependent format and supplied from the real-time processing section 20, in a vehicle-independent format. The data-system functional block group 36 may include an API that provides a function of transmitting designated vehicle data to the ECU or the like via Ethernet. In particular, when the destination is the extra-vehicle communication device 7, the extra-vehicle communication device 7 may upload the transmitted vehicle data to the cloud.

The communication with other in-vehicle devices 5 to 7 via the control-system functional block group 35 is not limited to the CAN FD, and the Ethernet or other communication means may be used. In addition, the communication with other in-vehicle devices 5 to 7 via the data-system functional block group 36 is not limited to the Ethernet, and the CAN FD or other communication means may be used.

The API gateway 40 is configured using a function of a virtual function bus (hereinafter, VFB). The VFB is middleware that enables SW-C communication and SW-C and BSW communication to be implemented without being conscious of hardware, a communication protocol, and the like, and is also referred to as a software bus. The SW-C communication is an access from the SW-C to an API provided by another SW-C, and the SW-C and BSW communication is an access from the SW-C to an API provided by each of the control-system functional block group 35 and the data-system functional block group 36.

That is, the SW-C accesses various APIs via the API gateway 40, and implements a desired function using a function provided by the accessed API.

The SW-C transmits an API access request when using the API. The API access request includes at least an application ID of a service application that includes the SW-C as a requester, and an API-ID that is information indicating an API as a request target.

As illustrated in FIG. 3, an application store 15 is installed in the server 3. As indicated by an arrow L1, the application store 15 has a function of registering a service application SA manufactured by a service provider SV in the application store 15, based on submission by the service provider SV who accessed the application store 15 using a communication device such as a personal computer. The service application SA registered in the application store 15 is posted on the website of the application store 15.

Further, as indicated by an arrow L2, the application store 15 has a function of registering the API used by the service application SA in the application store 15, based on submission by the service provider SV.

When a user US who has accessed the website of the application store 15 purchases the service application SA, the service application SA is installed in the ECU 4 mounted in the vehicle of the user US, as indicated by an arrow L3.

When the service application SA transmits the API access request to the API gateway 40, as indicated by an arrow L4, the API gateway 40 transfers the API access request to the control-system functional block group 35, as indicated by an arrow L5. As described above, the control-system functional block group 35 converts the API access request into an API access request expressed in a vehicle-dependent format and provides the API access request to the real-time processing section 20.

As indicated by an arrow L6, the API gateway 40 transmits, to the application store 15, a statistical access log including the API usage count, calculated in consideration of the execution accomplishment status of the API access requests, and the communication data amount associated with API usage.

The application store 15 calculates an API usage fee generated by the service application SA using the API, based on the statistical access log received from the API gateway 40, and charges the service provider SV for the API usage fee. The service provider SV pays the charged API usage fee to the application store 15, as indicated by arrow L7.

The application store 15 calculates an application usage fee of the service application SA based on the usage status of the service application SA, and charges the user US for the application usage fee. The user US pays the charged application usage fee to the application store 15, as indicated by an arrow L8. As indicated by an arrow L9, the application store 15 transfers the application usage fee paid by the user US to the service provider SV.

Next, a procedure when the service provider SV makes an API usage contract will be described.

Figure 4A:
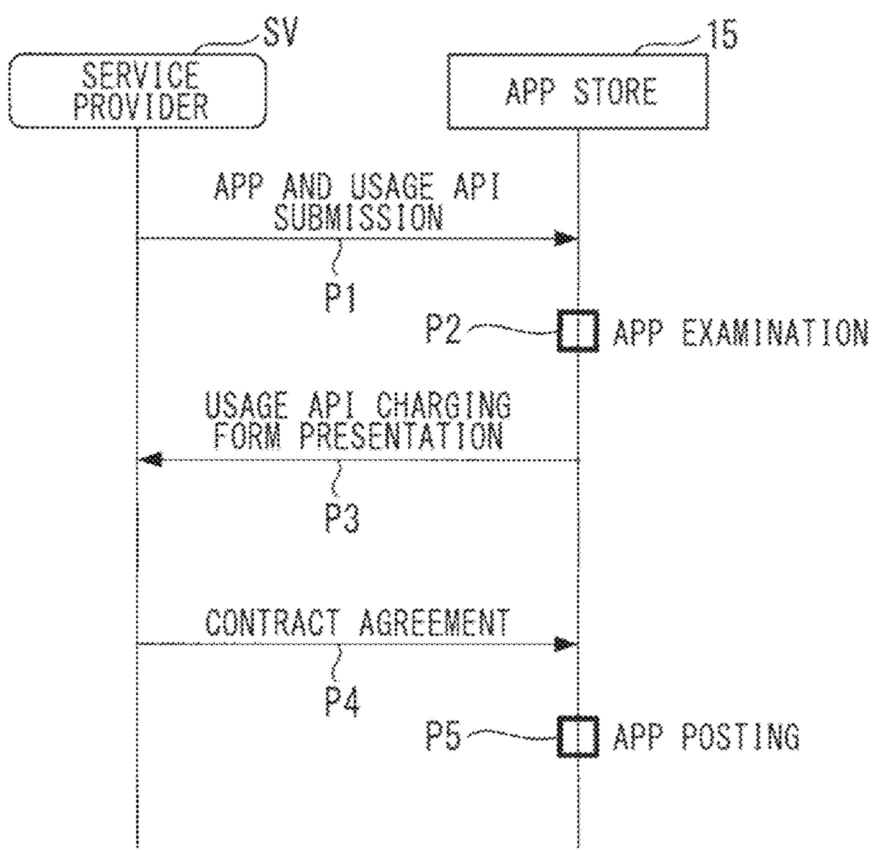
FIG. 4A is a diagram illustrating a procedure for an application programming interface (API) contract.

As illustrated in process P1 of FIG. 4A, the service provider SV accesses the application store 15 and submits the registration of a service application to be posted and an API to be used.

As indicated by process P2, the application store 15 examines whether the service application submitted by the service provider SV can access the control-system functional block group 35.

When the submitted service application can access the control-system functional block group 35, the application store 15 presents the usage API charging form to the service provider SV, as indicated in process P3.

Figure 4B:
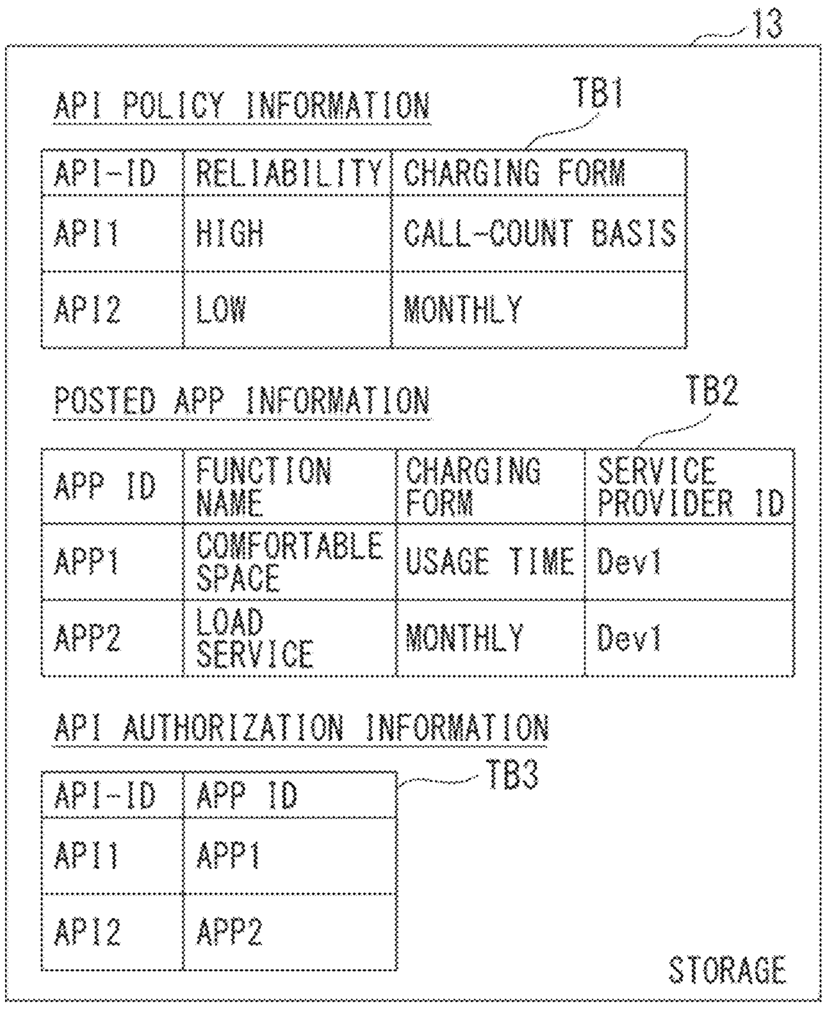
FIG. 4B is a diagram illustrating information stored in a storage section.

As illustrated in Table TB1 in FIG. 4B, the application store 15 stores API policy information including an API-ID, reliability, and a charging form for each submitted API in the storage section 13.

In Table TB1, the reliability of the API with API-ID of API1 is "high", the charging form is "call-count basis", the reliability of the API with API-ID of API2 is "low", and the charging form is "monthly".

The API with the reliability set to "high" accepts an API access request from a service application with higher reliability and rejects an API access request from a service application with lower reliability.

The API with the reliability set to "low" accepts an API access request even from a service application with low reliability.

The "call-count basis" refers to a charging form in which a fee is added according to the number of times of API access requests. The "monthly" refers to a charging form in which a fixed fee independent of the number of times of API access requests is charged every month.

As illustrated in process P4, the service provider SV notifies the application store 15 that the service provider SV agrees to the contract on the presented usage API charging form. As a result, the application store 15 posts the service application submitted by the service provider SV on the website of the application store 15, as illustrated in process P5.

The application store 15 stores, in the storage section 13, information on the service application posted on the website (hereinafter, posted application information) and information on an API authorized for the service application posted on the website (hereinafter, API authorization information).

As illustrated in Table TB2 in FIG. 4B, the posted application information includes, for each posted service application, an application ID, the function name of the service application, a charging form of the service application, and a service provider ID. The application ID is information for identifying a service application. The service provider ID is information for identifying a provider of the service application.

In Table TB2, the function name of the service application with application ID of APP1 is "comfort air conditioning", the charging form is "usage time", and the service provider ID is "Dev1". The function name of the service application with application ID of APP2 is "load service", the charging form is "monthly", and the service provider ID is "Dev1".

The "usage time" charging form is a charging form in which a charge is added according to the usage time of the service application. The "monthly fee" of the charging form is a charging form in which a fixed fee independent of the usage time of the service application is charged every month.

As illustrated in Table TB3 in FIG. 4B, the API authorization information includes an API-ID and an application ID for each API authorized to be used.

Table TB3 indicates that the API with API-ID of API1 is called by the service application with application ID of APP1, and the API with API-ID of API2 is called by the service application with application ID of APP2.

Next, a procedure for a log creation process executed by the API gateway 40 will be described. The log creation process is a process repeatedly executed during the operation of the ECU 4.

Figure 5:
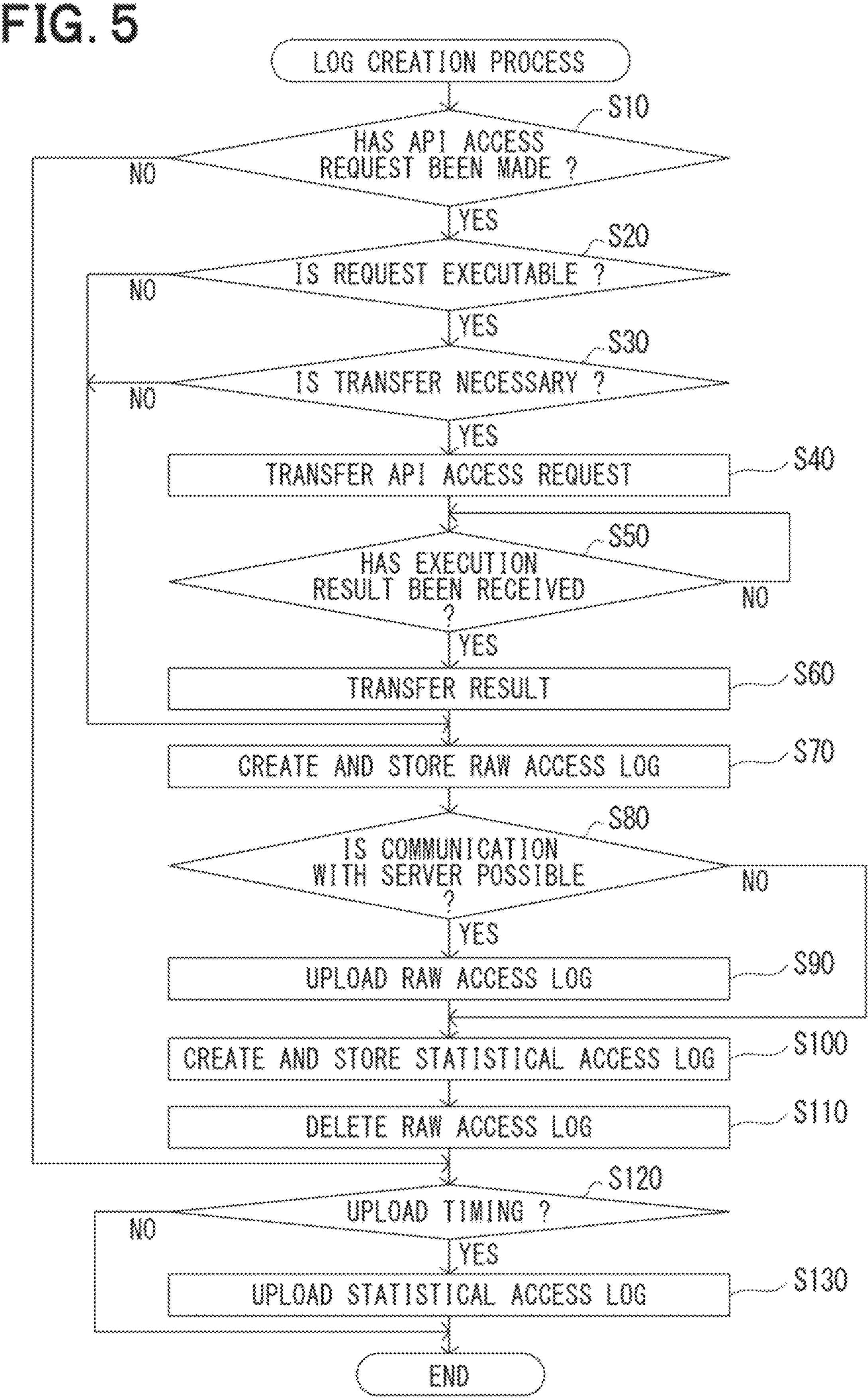
FIG. 5 is a flowchart illustrating a log creation process according to a first embodiment.

When the log creation process is executed, as illustrated in FIG. 5, the API gateway 40 (hereinafter, API GW 40) first determines whether an API access request has been received in S10. Here, when the API access request has not been received, the API GW 40 proceeds to S120. On the other hand, when the API access request has been received, the API GW 40 determines whether the received API access request is executable in S20. For example, the API GW 40 determines whether the ECU 4 can perform data communication with the ECU 6 that executes the processing instructed by the API access request. When data communication is possible, the API GW 40 determines that the API access request is executable, and when data communication is not possible, API GW determines that the API access request is not executable.

Here, when the API access request is not executable, the API GW 40 proceeds to S70. On the other hand, when the API access request is executable, the API GW 40 determines whether the received API access request needs to be transmitted to the API as the request target in S30. For example, when the process instructed by the API access request has already been executed, the API GW 40 determines that the API access request does not need to be transferred to the API as the request target.

Here, when the API access request does not need to be transferred, the API GW 40 proceeds to S70. On the other hand, when the API access request needs to be transferred, the API GW 40 transfers the received API access request to the API as the request target in S40.

Then, in S50, the API GW 40 determines whether an execution result of the transferred API access request has been received from the API that has transferred the API access request. Here, when the execution result has not been received, the process of S50 is repeated to wait until the execution result is received.

When the execution result of the API access request is received, the API GW 40 transfers the execution result received from the API to the service application as the requester of the API access request in S60, and the process proceeds to S70.

When the processing proceeds to S70, the API GW 40 creates a raw access log for the API access request determined to have been received in S10, and stores the created raw access log in the RAM 4*c*. Specifically, for the API access request transferred in S40, the API GW 40 creates a raw access log including the content of the API access request and the content of the execution result transferred in S60. The raw access log including the content of the execution result is, for example, information such as "At what time, minute, and second, application A called API-B with parameter C, and the result was D". The API GW 40 may generate and upload a raw access log when there is an API access request, and may generate and upload a raw access log when an execution result is acquired.

For the API access request not transferred in S40, the API GW 40 creates a raw access log including the content of the API access request and the reason why the API access request was not transferred.

Next, in S80, the API GW 40 determines whether data communication with the server 3 is possible. Here, when data communication with the server 3 is not possible, the API GW 40 proceeds to S100. On the other hand, when data communication with the server 3 is possible, the API GW 40 uploads the raw access log stored in the RAM 4*c* in S70 to the server 3 in S90, and proceeds to S100.

When the process proceeds to S100, the API GW 40 creates a statistical access log based on the raw access log stored in the RAM 4*c* in S70, and stores the created statistical access log in the flash ROM 4*d*.

The statistical access log is specified by the application providing the API, the API, and the requester of the API access request. That is, when the number of applications providing APIs is A, the number of APIs is B, and the number of requesters of the API access requests is C, the number of statistical access logs is A×B×C.

As illustrated in FIG. 6, a statistical access log includes the following data: an API-providing application ID, an API-ID, a caller application ID, an API call count, an API execution completion count, an API execution unnecessary occurrence count, an API execution anomaly count, an API communication data amount, an execution completion count during non-powered parking, an execution completion count during powered parking, an execution completion count during stop, and an execution completion count during travel.

The API-providing application ID is the identifier of the application providing the API. The API-ID is the identifier of the API. The caller application ID is the identifier of the application using the API.

The API call count is the number of times the service application specified by the caller application ID made an API access request.

The API execution completion count is the number of times the process in response to the API access request was executed and completed.

The API execution unnecessary occurrence count is the number of times the execution of the process in response to the API access request became unnecessary because the process had already been executed.

The API execution anomaly count is the number of times the process in response to the API access request was not executed due to an anomaly.

The API communication data amount is an integrated value of the amount of data acquired by the process in response to the API access request.

The execution completion count during non-powered parking is the number of times the process in response to the API access request was executed and completed during non-powered parking.

The execution completion count during the powered parking is the number of times the process in response to the API access request was executed and completed during the powered parking.

The execution completion count during stop is the number of times the process in response to the API access request was executed and completed while the vehicle is stopped.

The execution completion count during travel is the number of times that the process in response to the API access request was executed and completed while the vehicle is traveling.

Next, a first specific example of statistical access log creation will be described.

It is assumed that the door of the vehicle during non-powered parking is in an unlocked state, and the service application transmits an API access request instructing door locking to the API GW 40. Upon receiving the API access request, the API GW 40 checks the status of the vehicle door. Because the vehicle door is in the unlocked state, the API GW 40 determines that the API access request needs to be transferred, and transfers the received API access request to the request-targeted API. Accordingly, the ECU 4 transmits a command for instructing door locking to the ECU 6 that controls the door. Upon receiving the command for instructing door locking, the ECU 6 that controls the door locks the vehicle door. When the vehicle door is completely locked, the ECU 6 that controls the door transmits an execution result indicating that the vehicle door is now locked to the ECU 4. Upon receiving the execution result from the request-targeted API, the API GW 40 transfers the execution result to the requester service application. Moreover, the API GW 40 increments (i.e., adds 1 to) the API call count and the API execution completion count in the statistical access log specified by the API-providing application ID, the API-ID, and the caller application ID, and increments the execution completion count during non-powered parking.

Next, a second specific example of statistical access log creation will be described.

It is assumed that the door of the vehicle during powered parking is in a locked state, and the service application transmits an API access request instructing door locking to the API GW 40. Upon receiving the API access request, the API GW 40 checks the status of the vehicle door. Since the vehicle door is in the locked state, the API GW 40 determines that the transfer of the API access request is unnecessary, and transmits a notification to the requester service application, indicating that the door locking instruction has been normally completed. Further, the API GW 40 increments the API call count and the API execution unnecessary occurrence count in the statistical access log.

Next, a third specific example of statistical access log creation will be described.

It is assumed that the door of the vehicle during non-powered parking is in the unlocked state, a first service application transmits an API access request instructing door locking to the API GW 40, and a second service application transmits an API access request instructing door unlocking to the API GW 40. The API GW 40 arbitrates between the first service application and the second service application. Since the second service application has a higher priority than the first service application, the API GW 40 transmits a notification indicating that the door locking instruction has not been executed due to arbitration failure to the first service application, and increments the API call count and the API execution anomaly count in the statistical access log of the first service application. In addition, since the vehicle door is in the unlocked state, the API GW 40 determines that the transfer of the API access request of the second service application is unnecessary, and transmits a notification to the second service application, indicating that the door unlocking instruction has been normally completed. Further, the API GW 40 increments the API call count and the API execution unnecessary occurrence count in the statistical access log of the second service application.

Next, a fourth specific example of statistical access log creation will be described.

It is assumed that the service application transmits an API access request for instructing acquisition of vehicle speed information to the API GW 40 while communication between the ECU 4 and the in-vehicle devices 5 to 7 is interrupted. Since communication is anomalous, the API GW 40 transmits a notification to the requester service application, indicating that the vehicle speed information cannot be acquired due to the communication anomaly. Moreover, the API GW 40 increments the API call count and the API execution anomaly count in the statistical access log specified by the API-providing application ID, the API-ID, and the caller application ID.

Next, a fifth specific example of statistical access log creation will be described.

It is assumed that the service application transmits an API access request instructing acquisition of vehicle speed information that is updated every 300 ms (milliseconds) to the API GW 40. Since 300 ms or more has elapsed from the previous API access request instructing acquisition of vehicle speed information, the API GW 40 determines that transfer of the API access request is necessary, and transfers the received API access request to the request-targeted API. Accordingly, the ECU 4 transmits a command for instructing acquisition of vehicle speed information to the ECU 6 that controls the engine. Upon acquiring the vehicle speed information, the ECU 6 that controls the engine transmits an execution result indicating the acquired vehicle speed information to the ECU 4. Upon receiving the execution result from the request-targeted API, the API GW 40 transfers the execution result to the requester service application. Further, the API GW 40 increments the API call count and the API execution completion count in the statistical access log specified by the API-providing application ID, the API-ID, and the caller application ID.

Moreover, it is assumed that after 100 ms elapses from the previous API access request instructing acquisition of vehicle speed information, the service application transmits an API access request instructing acquisition of vehicle speed information to the API GW 40. Since 300 ms or more has not elapsed from the previous API access request, the API GW 40 determines that the transfer of the API access request is unnecessary, transmits the vehicle speed information having the same value as the previous value to the requester service application, and increments the API call count and the API execution unnecessary occurrence count in the statistical access log.

Next, a sixth specific example of statistical access log creation will be described.

It is assumed that the service application transmits an API access request instructing acquisition of surrounding map data to the API GW 40. The API GW 40 determines that the API access request needs to be transferred, and transfers the received API access request to the request-targeted API. As a result, the ECU 4 transmits a command for instructing acquisition of surrounding map data to the ECU 6 that controls the navigation device. Upon acquiring the surrounding map data, the ECU 6 that controls the navigation device transmits an execution result indicating the acquired surrounding map data to the ECU 4. Upon receiving the execution result from the request-targeted API, the API GW 40 transfers the execution result to the requester service application. Moreover, the API GW 40 increments the API call count and the API execution completion count in the statistical access log specified by the API-providing application ID, the API-ID, and the caller application ID, and adds a value corresponding to the surrounding map data amount to the API communication data amount.

As illustrated in FIG. 5, when the process of S100 is terminated, the API GW 40 deletes the raw access log stored in the RAM 4*c* in S110, and proceeds to S120.

When the process proceeds to S120, the API GW 40 determines whether the upload timing has arrived. The upload timing is set to arrive every 24 hours, for example. The upload timing may be set to arrive, for example, when the API access request is generated N times, or may be set to arrive when the service application SA using the API is terminated. In this manner, the upload timing may be set to be a longer interval than the transmission of the raw access log.

Here, when the upload timing has not arrived, the API GW 40 terminates the log creation process. On the other hand, when the upload timing arrives, the API GW 40 uploads all the statistical access logs to the server 3 in S130, and terminates the log creation process.

Next, procedures for user settlement and service provider settlement will be described.

Figure 7:
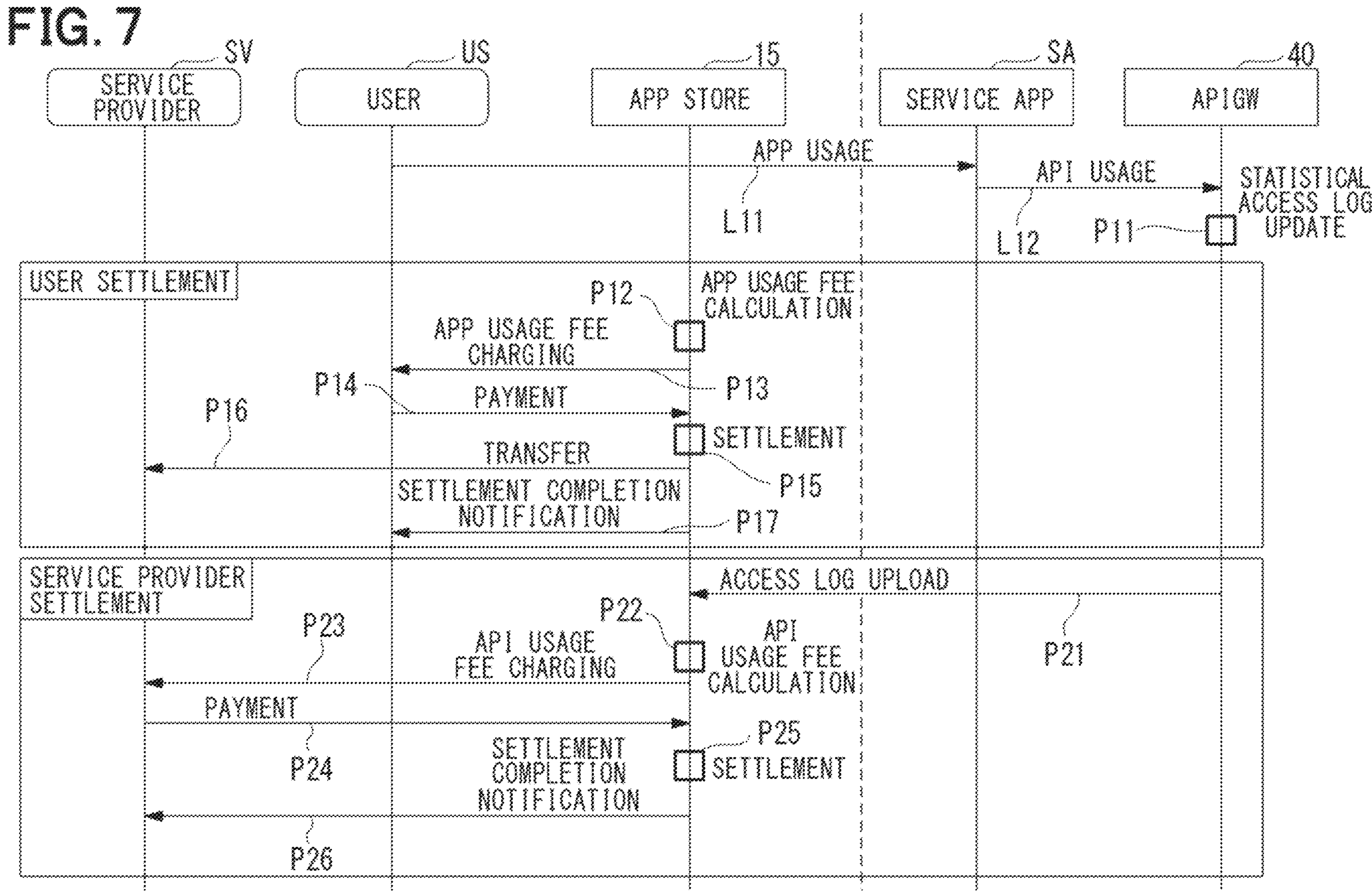
FIG. 7 is a sequence diagram illustrating a settlement procedure.

The user US uses the service application SA, as indicated by an arrow L11 in FIG. 7, and the service application SA uses the API, as indicated by an arrow L12. Each time the service application SA uses the API, the API GW 40 updates the statistical access log, as indicated in process P11.

As illustrated in process P12, the application store 15 calculates an application usage fee generated by the user US using the service application SA every month, for example, and charges the user US for the calculated application usage fee, as illustrated in process P13.

As illustrated in process P14, when the user US pays the application usage fee to the application store 15, the application store 15 settles the application usage fee, as illustrated in process P15. Thereafter, the application store 15 transfers the application usage fee to the service provider SV, as illustrated in process P16, and notifies the user US of the completion of the settlement, as illustrated in process P17.

As indicated in process P21, when the API GW 40 uploads the statistical access log, the application store 15 calculates the API usage fee generated by the service application SA using the API, based on the statistical access log, as indicated in process P22.

For each statistical access log specified by the API-providing application ID, the API-ID, and the caller application ID, the application store 15 sets an execution completion charging coefficient C1, an execution unnecessary charging coefficient C2, an execution anomaly charging coefficient C3, a communication data charging coefficient C4, an execution completion charging coefficient C5 during non-powered parking, an execution completion charging coefficient C6 during powered parking, an execution completion charging coefficient C7 during stop, and an execution completion charging coefficient C8 during travel.

The execution completion charging coefficient C1 is the amount charged when the API execution completion count is 1.

The execution unnecessary charging coefficient C2 is the amount charged when the API execution unnecessary occurrence count is 1.

The execution anomaly charging coefficient C3 is the amount charged when the API execution anomaly count is 1.

The communication data charging coefficient C4 is the amount charged per unit communication data amount.

The execution completion charging coefficient C5 during non-powered parking is the amount charged when the execution completion count during non-powered parking is 1.

The execution completion charging coefficient C6 during powered parking is the amount charged when the execution completion count during powered parking is 1.

The execution completion charging coefficient C7 during stop is the amount charged when the execution completion count during stop is 1.

The execution completion charging coefficient C8 during travel is the amount charged when the execution completion count during travel is 1.

That is, the application store 15 calculates the API usage fee by multiplying the number of times or the amount of data by the corresponding coefficient for one statistical access log. Further, the application store 15 calculates the API usage fee of the service application SA by integrating the API usage fee of all the statistical access logs.

When there are a plurality of APIs that operate the same actuator and the plurality of APIs have different arbitration priorities, the charging coefficient of the API with a high priority is greater than the charging coefficient of the API with a low priority.

The execution completion charging coefficient C5 during non-powered parking is greater than the execution completion charging coefficient C6 during powered parking. That is, the charged amount is greater during non-powered parking with limited power than during powered parking with power supply.

In addition, the execution completion charging coefficient C7 during stop is greater than the execution completion charging coefficient C8 during travel. That is, the charged amount is greater during a stop with limited power than during travel with power generation.

In addition, when there are a plurality of APIs that acquire the same information and the plurality of API have different responsiveness, the charging coefficient of the API with higher responsiveness is greater than the charging coefficient of the API with lower responsiveness.

In addition, the charging coefficient varies depending on the quality of the acquired data. For example, data that requires know-how, such as narrow-road scene determination, has a large charging coefficient, and simple data, such as vehicle speed information, has a small charging coefficient. The availability of equipment (e.g., Capability update notification) is free at the time of initial installation, and a change notification is charged. In addition, a charging coefficient of an API that simultaneously acquires a plurality of pieces of data, such as time-stamped data, is large.

Further, the application store 15 increases or decreases the usage fee from the API usage fee calculated using the statistical access log according to the content of each raw access log. The application store 15 calculates the API usage fee using the statistical access log, but may dynamically change the calculated API usage fee according to the content of each raw access log. The application store 15 may calculate the API usage fee by using only the statistical access log.

When the calculation of the API usage fee of the service application SA is completed, the application store 15 charges the service provider SV with the calculated API usage fee, as illustrated in process P23.

As illustrated in process P24, when the service provider SV pays the API usage fee to the application store 15, the application store 15 settles the API usage fee, as illustrated in process P25. Thereafter, the application store 15 notifies the service provider SV of the completion of the settlement, as indicated in process P26.

The ECU 4 of the vehicle control system 2 configured as described above is mounted in a vehicle and includes the API gateway 40. The API gateway 40 is configured to implement coordination between the service-system functional block group 33, configured to provide a service to a vehicle (hereinafter, equipped vehicle) equipped with the ECU 4, and the control-system functional block group 35, configured to control the equipped vehicle.

The control-system functional block group 35 includes the API group 37. The API group 37 is configured to convert an API access request, expressed in a vehicle-independent format and transmitted from the service-system functional block group 33, into a vehicle-dependent format.

The API gateway 40 is configured to transfer the API access request transmitted from the service-system functional block group 33 to the control-system functional block group 35.

The API gateway 40 is configured to create, for each API access request, a raw access log indicating an execution status of the API access request, and store the created raw access log in the RAM 4*c*.

The API gateway 40 is configured to execute a statistical process on the execution statuses of the plurality of API access requests, create a statistical access log indicating a result of the statistical process, and store the created statistical access log in the flash ROM 4*d*.

The API gateway 40 is configured to transmit the statistical access log to the server 3 when a preset statistical transmission condition is satisfied. The server 3 is installed outside the vehicle and performs a charging process based on the statistical access log. The statistical transmission condition of the present embodiment is that the upload timing arrives.

The API gateway 40 is configured to transmit the raw access log stored in the RAM 4*c* to the server 3 when data communication with the server 3 is possible.

The API gateway 40 is configured to delete the raw access log from the RAM 4*c* when a preset log deletion condition is satisfied. The log deletion condition of the present embodiment is that a raw access log to be deleted has been used for the statistical process to create a statistical access log.

Such an ECU 4 can transmit the statistical access log and the raw access log to the server 3 that performs the charging process. Therefore, the ECU 4 can cause the server 3 to use the statistical access log and the raw access log to calculate the API usage fee generated by the service-system functional block group 33 using the API group 37.

Then, the server 3 can calculate the API usage fee by using not only the statistical access log, which is processed by the statistical process using the plurality of raw access logs and has a reduced amount of information, but also the raw access log, which has a large amount of information because the execution status is indicated for each access request. Therefore, the ECU 4 can cause the server 3 to appropriately calculate the API usage fee according to the use of the API group 37.

Further, the ECU 4 transmits the raw access log stored in the RAM 4*c* to the server 3 when data communication with the server 3 is possible, and deletes the raw access log from the RAM 4*c* when the log deletion condition is satisfied. Therefore, the ECU 4 can suppress the occurrence of a situation where a new raw access log cannot be transmitted to the server 3 due to the fact that a new raw access log cannot be stored because the raw access log is stored up to the upper limit of the storage capacity of the RAM 4*c*. This enables the ECU 4 to suppress the occurrence of a situation where a service provider who provides a service to the vehicle cannot be charged appropriately.

The RAM 4*c* includes a volatile memory. In general, volatile memory is less expensive than nonvolatile memory, and hence volatile memory is more likely to increase the storage capacity for storing raw access logs than nonvolatile memory. Thus, by including the volatile memory, the ECU 4 can prevent the raw access log from being stored up to the upper limit of the storage capacity of the RAM 4*c*, and can further suppress the occurrence of a situation where the service provider cannot be charged appropriately.

The log deletion condition is that the raw access log to be deleted has been used for the statistical process to create the statistical access log. Therefore, the ECU 4 can prevent the raw access log from being stored up to the upper limit of the storage capacity of the RAM 4*c*, and can further prevent the occurrence of a situation where the service provider cannot be charged appropriately.

In the embodiment described above, the ECU 4 corresponds to an electronic control device, the service-system functional block group 33 corresponds to a service-system functional block, the control-system functional block group 35 corresponds to a control-system functional block, and the API gateway 40 corresponds to a coordination control section.

The API group 37 corresponds to a functional interface, S40 corresponds to a process as a request transfer section, the API access request corresponds to an access request, S70 corresponds to a process as a log creation section, the raw access log corresponds to an access log, and the RAM 4*c* corresponds to a first storage section.

S100 corresponds to a process as a statistical log creation section, the flash ROM 4*d* corresponds to a second storage section, S120 and S130 correspond to a process as a statistical transmission section, S80 and S90 correspond to a process as a log transmission section, and S110 corresponds to a process as a log deletion section.

The API call count corresponds to a call count, the API execution completion count corresponds to an execution completion count, the API execution unnecessary occurrence count corresponds to an execution unnecessary occurrence count, and the API communication data amount corresponds to an integrated value of the amount of data.

Second Embodiment

Hereinafter, a second embodiment of the present disclosure will be described with reference to the drawings. In the second embodiment, parts different from the first embodiment will be described. Common configurations are denoted by the same reference numerals.

The service provision system 1 of the second embodiment differs from that of the first embodiment in that the log creation process is changed.

The log creation process of the second embodiment differs from that of the first embodiment in that the processes of S112 and S114 are executed instead of the process of S110.

Figure 8:
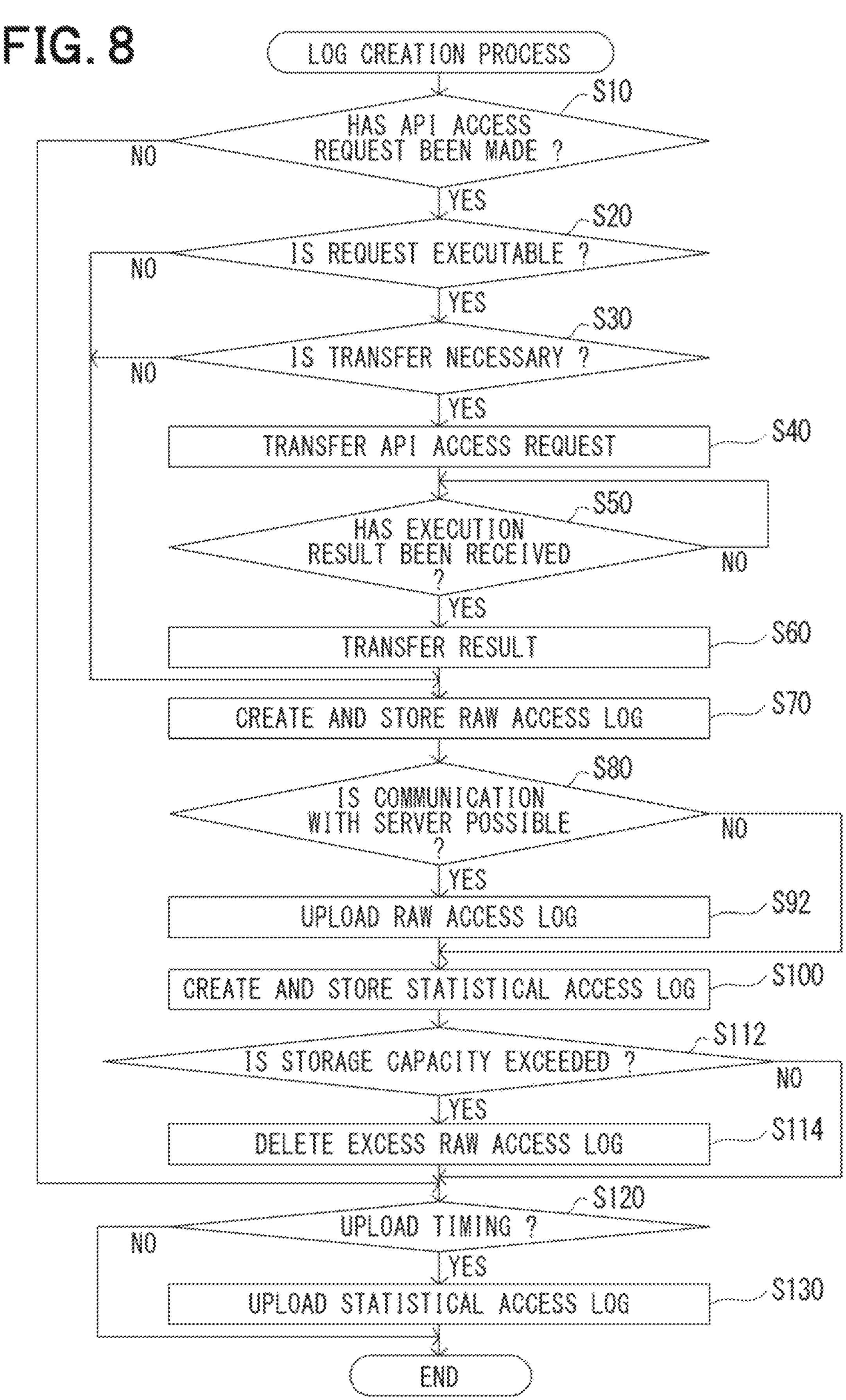
FIG. 8 is a flowchart illustrating a log creation process according to a second embodiment.

That is, as illustrated in FIG. 8, when the process of S100 is terminated, the API GW 40 determines in S112 whether the raw access log is stored beyond the raw log storage capacity allocated to store the raw access log in the RAM 4*c*.

Here, when the raw access log is not stored beyond the raw log storage capacity, the API GW 40 proceeds to S120. On the other hand, when the raw access log is stored beyond the raw log storage capacity, the API GW 40 deletes the excess raw access log from the RAM 4*c* in S114, and proceeds to S120. Specifically, the API GW 40 sequentially deletes the raw access logs in order of the earliest timing of storage in the RAM 4*c* until the amount of data in the raw access logs in which the raw access logs are stored is equal to or less than the raw log storage capacity.

In the ECU 4 configured as described above, the API gateway 40 is configured to delete the raw access log from the RAM 4*c* when a preset log deletion condition is satisfied. The log deletion condition of the present embodiment is that the amount of data in the raw access logs stored in the RAM 4*c* exceeds a preset raw log storage capacity.

Such an ECU 4 can suppress the occurrence of a situation where the raw access log is deleted from the RAM 4*c* and is not transmitted to the server 3, and can further suppress the occurrence of a situation where the service provider cannot be charged appropriately.

In the embodiment described above, S112 and S114 correspond to a process as a log deletion section, and the raw log storage capacity corresponds to a deletion determination value.

Although one embodiment of the present disclosure has been described above, the present disclosure is not limited to the above embodiment, and various modifications can be made.

First Modification

In the above embodiment, the form in which the API gateway 40 transfers the API access request to the control-system functional block group 35 has been described, but the API gateway 40 may transmit the API access request to the service application.

Specifically, for example, when the service application SA1 transmits an API access request to the API gateway 40, as indicated by an arrow L11 in FIG. 9, the API gateway 40 transmits the API access request to the service application SA2, as indicated by an arrow L12. The service applications SA1, SA2 are applications that provide different services.

The service application SA2 transmits the data requested by the received API access request to the API gateway 40. Then, the API gateway 40 transmits the data received from the service application SA2 to the service application SA1.

The API gateway 40 creates a raw access log for the API access request received from the service application SA1, and further creates a statistical access log based on the raw access log. The API gateway 40 transmits the created statistical access log to the application store 15, as indicated by an arrow L13.

The service application SA1 corresponds to a first service-system functional block, and the service application SA2 corresponds to a second service-system functional block.

The ECU 4 and the technique thereof described in the present disclosure may be implemented by a dedicated computer provided by configuring a processor and a memory programmed to execute one or a plurality of functions embodied by a computer program. Alternatively, the ECU 4 and the technique according to the present disclosure may be implemented by a dedicated computer provided by constituting a processor with one or more dedicated hardware logic circuits. Alternatively, the ECU 4 and the technique thereof according to the present disclosure may be implemented using one or a plurality of dedicated computers constituted by a combination of the processor and the memory programmed to execute one or more functions and the processor with one or more hardware logic circuits. The computer program may be stored in a computer-readable non-transitional tangible recording medium as an instruction to be executed by the computer. The technique for implementing the function of each section included in the ECU 4 does not necessarily include software, and all the functions may be implemented using one or a plurality of pieces of hardware.

A plurality of functions of one component in the above embodiment may be implemented by a plurality of components, or one function of one component may be implemented by a plurality of components. A plurality of functions of a plurality of components may be implemented by one component, or one function implemented by a plurality of components may be implemented by one component. A part of the configuration of the above embodiment may be omitted. At least a part of the configuration of the above embodiment may be added to or replaced with the configuration of another embodiment.

In addition to the ECU 4 of the display device described above, the present disclosure can be achieved in various forms such as a system including the ECU 4 as a component, a program for causing a computer to function as the ECU 4, a non-transitory tangible recording medium such as a semiconductor memory in which the program is recorded, and a management method.

What is claimed is:

1. An electronic control device mounted in a vehicle, the electronic control device comprising a coordination control section configured to implement coordination between a service-system functional block, configured to provide a service to an equipped vehicle that is the vehicle equipped with the electronic control device, and a control-system functional block, configured to control the equipped vehicle, wherein the control-system functional block includes a functional interface configured to convert an access request, expressed in a vehicle-independent format and transmitted from the service-system functional block, into a vehicle-dependent format, and the coordination control section includes a request transfer section configured to transfer the access request transmitted from the service-system functional block to the control-system functional block, a log creation section configured to create an access log indicating an execution status of the access request for each of access requests, that is the access request, transmitted from the service-system functional block, and store the created access log in a preset first storage section, a statistical log creation section configured to execute a statistical process on execution statuses of a plurality of the access requests, create a statistical access log indicating a result of the statistical process, and store the created statistical access log in a preset second storage section, a statistical transmission section configured to transmit the statistical access log to a server that is installed outside the vehicle and performs a charging process based on the statistical access log when a preset statistical transmission condition is satisfied, a log transmission section configured to transmit the access log stored in the first storage section to the server when data communication with the server is possible, and a log deletion section configured to delete the access log from the first storage section when a preset log deletion condition is satisfied.

2. The electronic control device according to claim 1, wherein the statistical transmission condition is set such that a transmission interval is longer than a transmission interval at which the log transmission section transmits the access log to the server, when data communication with the server is possible.

3. The electronic control device according to claim 1, wherein the first storage section includes a volatile memory.

4. The electronic control device according to claim 1, wherein the log deletion condition is that the access log to be deleted has been used for the statistical process by the statistical log creation section.

5. The electronic control device according to claim 1, wherein the log deletion condition is that an amount of data in the access log stored in the first storage section exceeds a preset deletion determination value.

6. The electronic control device according to claim 1, wherein the statistical access log includes at least one of the following:

a call count that is the number of times the service-system functional block has transferred the access request, an execution completion count that is the number of times a process in response to the access request has been executed and completed, an execution unnecessary occurrence count that is the number of times execution of the process in response to the access request has been unnecessary, and an integrated value of an amount of data acquired by the service-system functional block as a result of execution of the process in response to the access request.

7. The electronic control device according to claim 1, wherein the log creation section creates the access log indicating an execution status of the access request transferred by the request transfer section.

8. The electronic control device according to claim 7, wherein the log creation section further creates the access log indicating an execution status of the access request that has failed to be transferred by the request transfer section.

9. The electronic control device according to claim 1, wherein the coordination control section is configured to transmit the access request to a second service-system functional block when the access request to the second service-system functional block is received from a first service-system functional block, the first service-system functional block being configured to provide a service to the equipped vehicle, the second service-system functional block being configured to provide a service different from the service of the first service-system functional block to the equipped vehicle, the log creation section creates the access log indicating an execution status of the access request transmitted to the second service-system functional block, and the statistical log creation section creates the statistical access log including the execution status of the access request transmitted to the second service-system functional block.

10. A non-transitory computer readable storage medium storing a management program for causing a computer of an electronic control device to function as the following sections, the electronic control device including a coordination control section configured to implement coordination between a service-system functional block, configured to provide a service to an equipped vehicle that is the vehicle equipped with the electronic control device, and a control-system functional block, configured to control the equipped vehicle and including a functional interface configured to convert an access request, expressed in a vehicle-independent format and transmitted from the service-system functional block, into a vehicle-dependent format, the following sections being:

a request transfer section configured to transfer the access request transmitted from the service-system functional block to the control-system functional block, a log creation section configured to create an access log indicating an execution status of the access request for each of access requests, that is the access request, transmitted from the service-system functional block, and store the created access log in a preset first storage section, a statistical log creation section configured to execute a statistical process on execution statuses of a plurality of the access requests, create a statistical access log indicating a result of the statistical process, and store the created statistical access log in a preset second storage section, a statistical transmission section configured to transmit the statistical access log to a server that is installed outside the vehicle and performs a charging process based on the statistical access log when a preset statistical transmission condition is satisfied, a log transmission section configured to transmit the access log stored in the first storage section to the server when data communication with the server is possible, and a log deletion section configured to delete the access log from the first storage section when a preset log deletion condition is satisfied.

11. A management method executed by an electronic control device that includes a coordination control section configured to implement coordination between a service-system functional block, configured to provide a service to an equipped vehicle that is the vehicle equipped with the electronic control device, and a control-system functional block, configured to control the equipped vehicle and including a functional interface configured to convert an access request, expressed in a vehicle-independent format and transmitted from the service-system functional block, into a vehicle-dependent format, the management method comprising:

transferring the access request transmitted from the service-system functional block to the control-system functional block, creating an access log indicating an execution status of the access request for each of access requests, that is the access request, transmitted from the service-system functional block, and storing the created access log in a preset first storage section, executing a statistical process on execution statuses of a plurality of the access requests, creating a statistical access log indicating a result of the statistical process, and storing the created statistical access log in a preset second storage section, transmitting the statistical access log to a server that is installed outside the vehicle and performs a charging process based on the statistical access log when a preset statistical transmission condition is satisfied, transmitting the access log stored in the first storage section to the server when data communication with the server is possible, and deleting the access log from the first storage section when a preset log deletion condition is satisfied.

12. An electronic control device mounted in a vehicle, the electronic control device comprising a coordination control section configured to implement coordination between a service-system functional block, configured to provide a service to an equipped vehicle that is the vehicle equipped with the electronic control device, and a control-system functional block, configured to control the equipped vehicle and including a functional interface configured to convert an access request, expressed in a vehicle-independent format and transmitted from the service-system functional block, into a vehicle-dependent format, wherein the coordination control section includes a request transfer section configured to transfer the access request transmitted from the service-system functional block to the control-system functional block, a log creation section configured to create an access log indicating an execution status of the access request for each of access requests, that is the access request, transmitted from the service-system functional block, and store the created access log in a preset first storage section, a statistical log creation section configured to execute a statistical process on execution statuses of a plurality of the access requests, create a statistical access log indicating a result of the statistical process, and store the created statistical access log in a preset second storage section, a statistical transmission section configured to transmit the statistical access log to a server that is installed outside the vehicle and performs a charging process based on the statistical access log when a preset statistical transmission condition is satisfied, a log transmission section configured to transmit the access log stored in the first storage section to the server when data communication with the server is possible, and a log deletion section configured to delete the access log from the first storage section when a preset log deletion condition is satisfied.

13. A service provision system comprising:

an electronic control device mounted in a vehicle; and a server configured to be capable of data communication with the electronic control device, wherein the electronic control device includes a coordination control section configured to implement coordination between a service-system functional block, configured to provide a service to an equipped vehicle that is the vehicle equipped with the electronic control device, and a control-system functional block, configured to control the equipped vehicle, the control-system functional block includes a functional interface configured to convert an access request, expressed in a vehicle-independent format and transmitted from the service-system functional block, into a vehicle-dependent format, the coordination control section includes a request transfer section configured to transfer the access request transmitted from the service-system functional block to the control-system functional block, a log creation section configured to create an access log indicating an execution status of the access request for each of access requests, that is the access request, transmitted from the service-system functional block, and store the created access log in a preset first storage section, a statistical log creation section configured to execute a statistical process on execution statuses of a plurality of the access requests, create a statistical access log indicating a result of the statistical process, and store the created statistical access log in a preset second storage section, a statistical transmission section configured to transmit the statistical access log to a server that is installed outside the vehicle and performs a charging process based on the statistical access log when a preset statistical transmission condition is satisfied, a log transmission section configured to transmit the access log stored in the first storage section to the server when data communication with the server is possible, and a log deletion section configured to delete the access log from the first storage section when a preset log deletion condition is satisfied, and the server uses the access log and the statistical access log created by the coordination control section to calculate an interface usage fee generated by the service-system function block using the functional interface.

* * * * *